United States Patent
Wu et al.

(10) Patent No.: US 8,484,489 B2
(45) Date of Patent: Jul. 9, 2013

(54) POWER SIGNAL DETECTING SYSTEM, METHOD AND A PORTABLE ELECTRONIC DEVICE THEREOF

(75) Inventors: Te-Lung Wu, Taipei Hsien (TW); Chun-Da Lee, Taipei Hsien (TW); Chien-Liang Chen, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 513 days.

(21) Appl. No.: 12/458,394

(22) Filed: Jul. 10, 2009

(65) Prior Publication Data
US 2010/0191985 A1   Jul. 29, 2010

(30) Foreign Application Priority Data
Jan. 23, 2009 (TW) ................... 98102787 A

(51) Int. Cl.
*G06F 1/26* (2006.01)
*G06F 11/30* (2006.01)

(52) U.S. Cl.
USPC ........................ 713/300; 713/322; 713/340

(58) Field of Classification Search
USPC .......................................... 713/300, 322, 340
See application file for complete search history.

(56) References Cited

U.S. PATENT DOCUMENTS

| | | | | |
|---|---|---|---|---|
| 6,076,171 A * | 6/2000 | Kawata | ........................ | 713/501 |
| 6,466,126 B2 * | 10/2002 | Collins et al. | ................ | 340/333 |
| 6,498,460 B1 * | 12/2002 | Atkinson | ..................... | 320/135 |
| 6,762,629 B2 * | 7/2004 | Tam et al. | ..................... | 327/114 |
| 6,788,156 B2 * | 9/2004 | Tam et al. | ....................... | 331/49 |
| 6,895,520 B1 * | 5/2005 | Altmejd et al. | ............... | 713/324 |
| 7,017,058 B2 | 3/2006 | Chen | | |
| 7,519,843 B1 * | 4/2009 | Buterbaugh et al. | .......... | 713/322 |
| 7,581,130 B2 * | 8/2009 | Carroll et al. | ................. | 713/340 |
| 2003/0076183 A1 * | 4/2003 | Tam et al. | ..................... | 331/100 |
| 2004/0049704 A1 * | 3/2004 | Yang et al. | .................... | 713/300 |
| 2004/0117680 A1 * | 6/2004 | Naffziger | ...................... | 713/322 |
| 2004/0133816 A1 * | 7/2004 | Miyairi et al. | ................ | 713/300 |
| 2004/0236969 A1 * | 11/2004 | Lippert et al. | ................ | 713/300 |
| 2005/0086545 A1 * | 4/2005 | Breen et al. | .................. | 713/300 |
| 2005/0102539 A1 * | 5/2005 | Hepner et al. | ................ | 713/300 |
| 2005/0242786 A1 * | 11/2005 | Sawyers et al. | ............... | 323/211 |
| 2006/0212636 A1 * | 9/2006 | Yasuo | .......................... | 710/303 |
| 2007/0088962 A1 * | 4/2007 | Yu | ................................. | 713/300 |
| 2007/0182378 A1 * | 8/2007 | Tsuji | ............................ | 320/132 |
| 2007/0216363 A1 * | 9/2007 | Kawamoto et al. | ........... | 320/132 |
| 2007/0288769 A1 * | 12/2007 | Chang et al. | ................. | 713/300 |
| 2008/0012585 A1 | 1/2008 | Chung et al. | | |

(Continued)

FOREIGN PATENT DOCUMENTS

| | | |
|---|---|---|
| CN | 2630926 Y | 8/2004 |
| TW | 567408 | 12/2003 |
| TW | I 316659 A | 11/2009 |

*Primary Examiner* — Vincent Tran
(74) *Attorney, Agent, or Firm* — Bacon & Thomas, PLLC

(57) ABSTRACT

A power signal detecting system and method thereof are disclosed. The power signal detecting system comprises a power supply and a portable electronic device. The portable electronic device is electrically connected with the power supply to receive a power signal. The portable electronic device comprises a sensing element, a detecting module and a power management module. The sensing element is used to connect the power signal. The detecting module is electrically connected to the sensing element and is used for detecting the power signal. The power management module electrically connects to the detecting module and is used for executing a power management for the portable electronic device by identifying the power signal.

16 Claims, 4 Drawing Sheets

U.S. PATENT DOCUMENTS

| | | | |
|---|---|---|---|
| 2008/0104428 A1* | 5/2008 | Naffziger et al. | 713/300 |
| 2009/0089595 A1* | 4/2009 | Brey et al. | 713/300 |
| 2009/0138733 A1* | 5/2009 | Winick et al. | 713/300 |
| 2009/0158061 A1* | 6/2009 | Schmitz et al. | 713/300 |
| 2009/0187776 A1* | 7/2009 | Baba et al. | 713/320 |
| 2010/0185878 A1* | 7/2010 | Rozen et al. | 713/300 |

* cited by examiner ise, another prior art technology disclosed the notebook

POWER SIGNAL DETECTING SYSTEM, METHOD AND A PORTABLE ELECTRONIC DEVICE THEREOF

BACKGROUND OF THE INVENTION

1. Field of the Invention

The invention relates to a power signal detecting system and method, and more particularly to a power signal detecting system and method capable of reducing the frequency of the CPU.

2. Description of the Related Art

With technological developments, notebook computers have become very popular electronic products in modern life. Due to manufacture cost consideration, usually the notebook computer is paired with a power supply supplying low power watts. However, for the performance and safety, the notebook computer system needs to be paired with a proper power supply. If the notebook computer system is connected to a power supply supplying inefficient power; for example, when a 90 watts power notebook computer system is connected to a power supply supplying 65 watts power, the performance and safety of the notebook computer system might be affected, and the power supply might also be damaged.

In prior art technology, a charger IC in the notebook computer system maybe used for detecting the inputted power signal to detect the watts of the power signal. When the watts of the power signal is not enough, the charger IC can only protect the notebook computer system by stopping charging the power supply, it can not protect the power supply. Alternatively, another prior art technology disclosed the notebook computer system with a comparer which detects the inputted power signal. However, this causes higher manufacture cost.

Therefore, it is desirable to provide a power signal detecting system and method to mitigate and/or obviate the aforementioned problems.

SUMMARY OF THE INVENTION

A main objective of the invention is to provide a power signal detecting system and a portable electronic device for identifying the power signal.

Another objective of the invention is to provide a method of detecting a power signal.

In order to achieve the above-mentioned objectives, the power signal detecting system of the invention comprises a power supply and a portable electronic device. The power supply may comprise an adapter. The portable electronic device is electrically connected with the power supply to receive a power signal. The portable electronic device comprises a sensing element, a detecting module, and a power management module. The power signal passes through the sensing element. The detecting module is electrically connected to the sensing element and is used for detecting the power signal. The power management module electrically connects to the detecting module and is used for executing a power management for the portable electronic device by recognizing the power signal.

The method of detecting the power signal of the invention comprises: inputting the power signal to pass through the sensing element; detecting the sensing element to generate a voltage signal; and performing a power management for the portable electronic device according to the voltage signal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
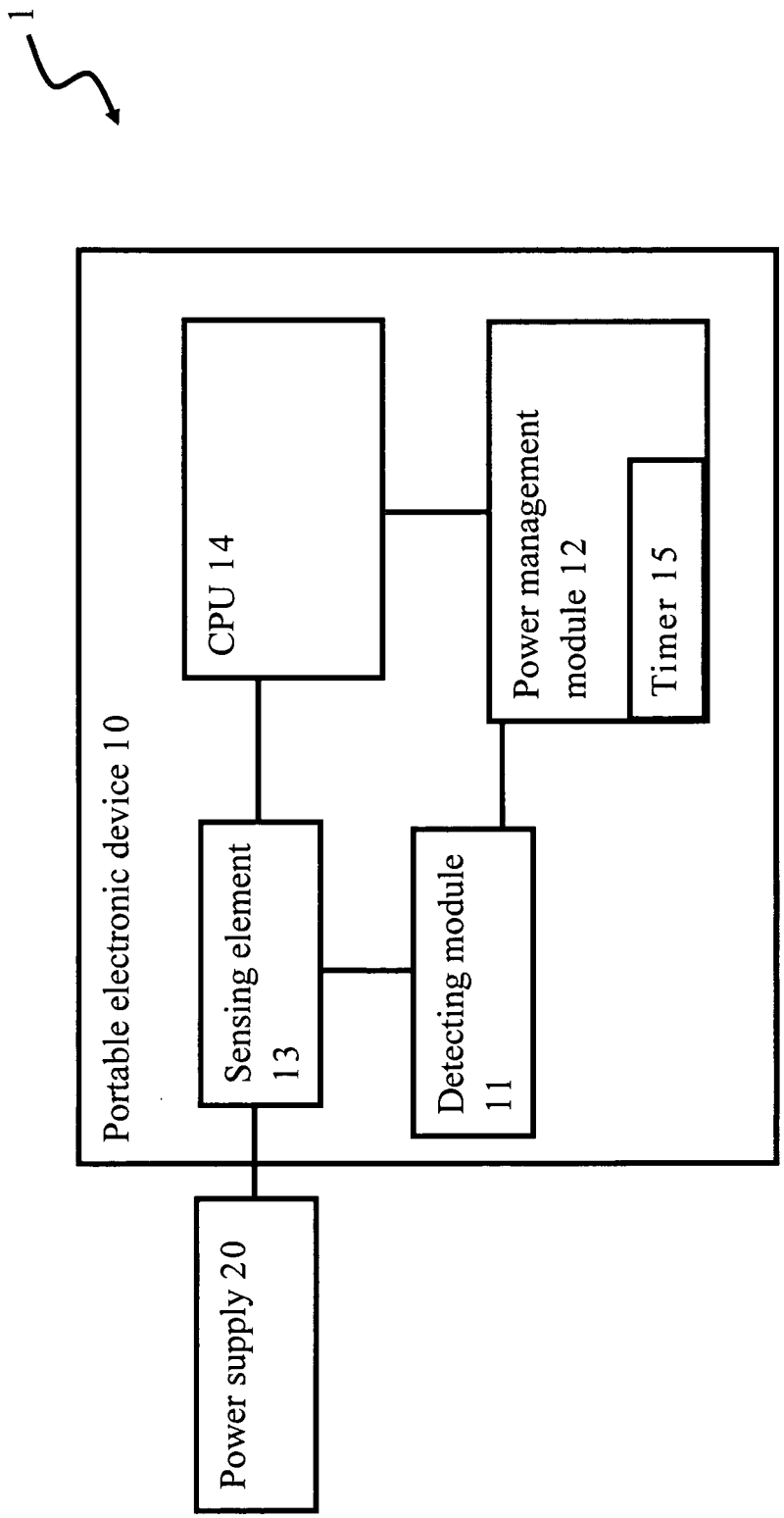
FIG. 1 is a block diagram of a power signal detecting system according to the invention.

Please refer to FIG. 1. FIG. 1 is a block diagram of a power signal detecting system according to the invention.

The power supply detecting system 1 comprises a portable electronic device 10 and a power supply 20. The power supply 20 may comprise an adapter. The power supply 20 is connected to the portable electronic device 10 to provide a power signal to the portable electronic device 10. The power supply detecting system 1 is used for detecting the watts of the power signal inputted by the power supply 20 to determine whether the power signal satisfies the setting of the portable electronic device 10.

In one embodiment of the invention, the portable electronic device 10 is a notebook computer, a desktop computer, or a cellphone, but other devices can also be utilized. The portable electronic device 10 comprises a detecting module 11, a power management module 12, a sensing element 13, a CPU 14, and a timer 15. The power signal inputted by the power supply 20 first passes through the sensing element 13. In this embodiment, the sensing element 13 is a resistor, but the invention can have other various designs. The detecting module 11 can be a charger IC connected to the battery (not shown) in the portable electronic device 10, but the invention can have other various designs. The detecting module 11 is electrically connected to the sensing element 13 and used for detecting the power signal passing through the sensing element 13. Therefore, the detecting module 11 generates voltage signals.

The power management module 12 can be a keyboard controller (KBC), an embedded controller (EC) or a microprocessor. The power management module 12 is electrically connected to the detecting module 11 and used for calculating the watts of the power signal according to the voltage signal of the detecting module 11 and identifying the supplying watts of the power supply 20. Afterward, a power management can be performed to the portable electronic device 10 based on the watts. For example, the frequency of the CPU 14 of the portable electronic device 10 is reduced to reduce the consuming watts of the portable electronic device 10. The method for the power management will be described later.

Furthermore, the power management module 12 has a timer 15. When the power supply 20 supplies the higher watts power signal, the power management module 12 increases the frequency of the CPU 14. In order to prevent the power management module 12 from mistake determination, the power management module 12 utilizes the timer 15 to repeat its determination process.

Figure 2:
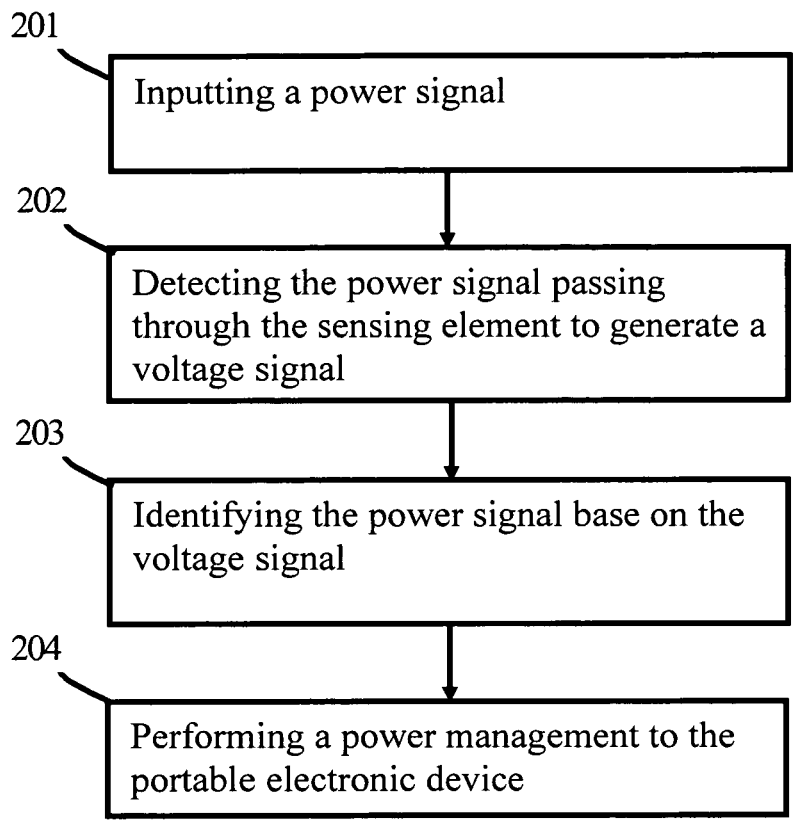
FIG. 2 is a flow chart of a method of detecting a power signal according to the invention.

Next, please refer to FIG. 2. FIG. 2 is a flow chart of a method of detecting a power signal according to the invention. Even power signal detecting system 1 is utilized in the following description to explain the method of detecting the power signal, the method of detecting the power signal is not limited for being applied onto the power signal detecting system 1.

First, the power supply 20 performs step 201: inputting a power signal.

The power supply 20 supplies a power signal and inputs the power signal into the portable electronic device 10.

Next, step 202 is performed: detecting the power signal passing through the sensing element 13 to generate a voltage signal.

The detecting module 11 detects the power signal passing through the sensing element 13. In this embodiment, the sensing element 13 is a resistor, and the power signal generates a voltage drop when it passes through the sensing element 13. The detecting module 11 detects the voltage drop and obtains a voltage signal.

Step 203 is performed by the portable electronic device 10: identifying the power signal based on the voltage signal.

After obtaining the voltage signal from step 202, the power management module 12 calculates the watts of the power signal supplied by the power supply 20.

Finally, step 204 is performed: performing a power management to the portable electronic device.

After obtaining the watts supplied by the power supply 20, the power management module 12 performs the power management to the portable electronic device 10 according to the watts supplied by the power supply 20. Therefore, the portable electronic device 10 or the power supply 20 can prevent from the short circuit or damage caused by the exceeded current.

If the portable electronic device 10 is connected to the power supply 20 supplying insufficient power watts, for example, when the portable electronic device 10 needs more than 65 watts power, but the connected power supply 20 can only supplies 65 watts power, the power management module 12 performs the power management to reduce the consume power of the individual unit in the portable electronic device 10 so the total consume power of the portable electronic device 10 does not exceed 65 watts. Therefore, the portable electronic device 10 and the power supply 20 are prevented from damages.

Figure 3A:
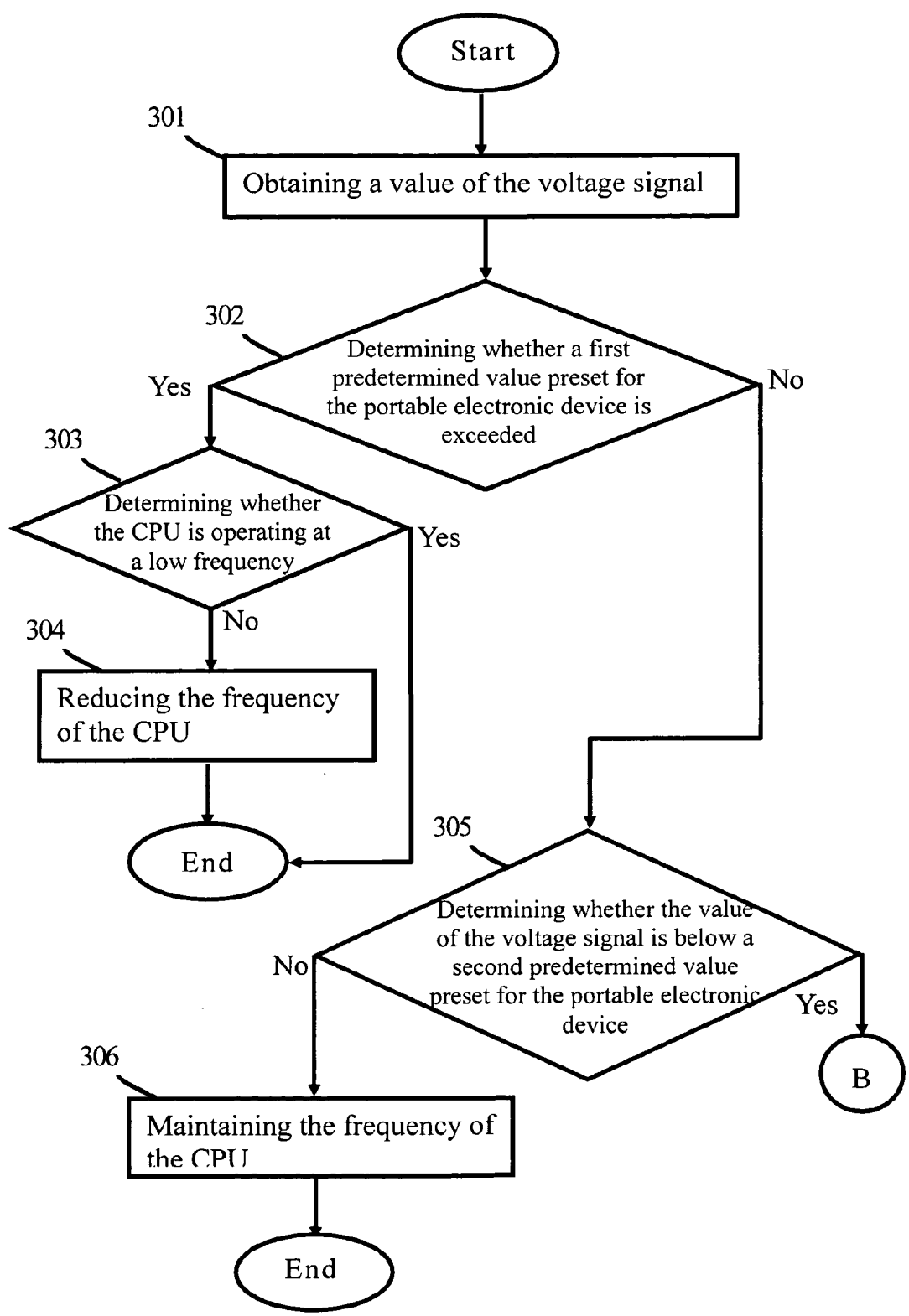
FIG. 3A-3B is a flow chart of a power management according to the invention.
Figure 3B:
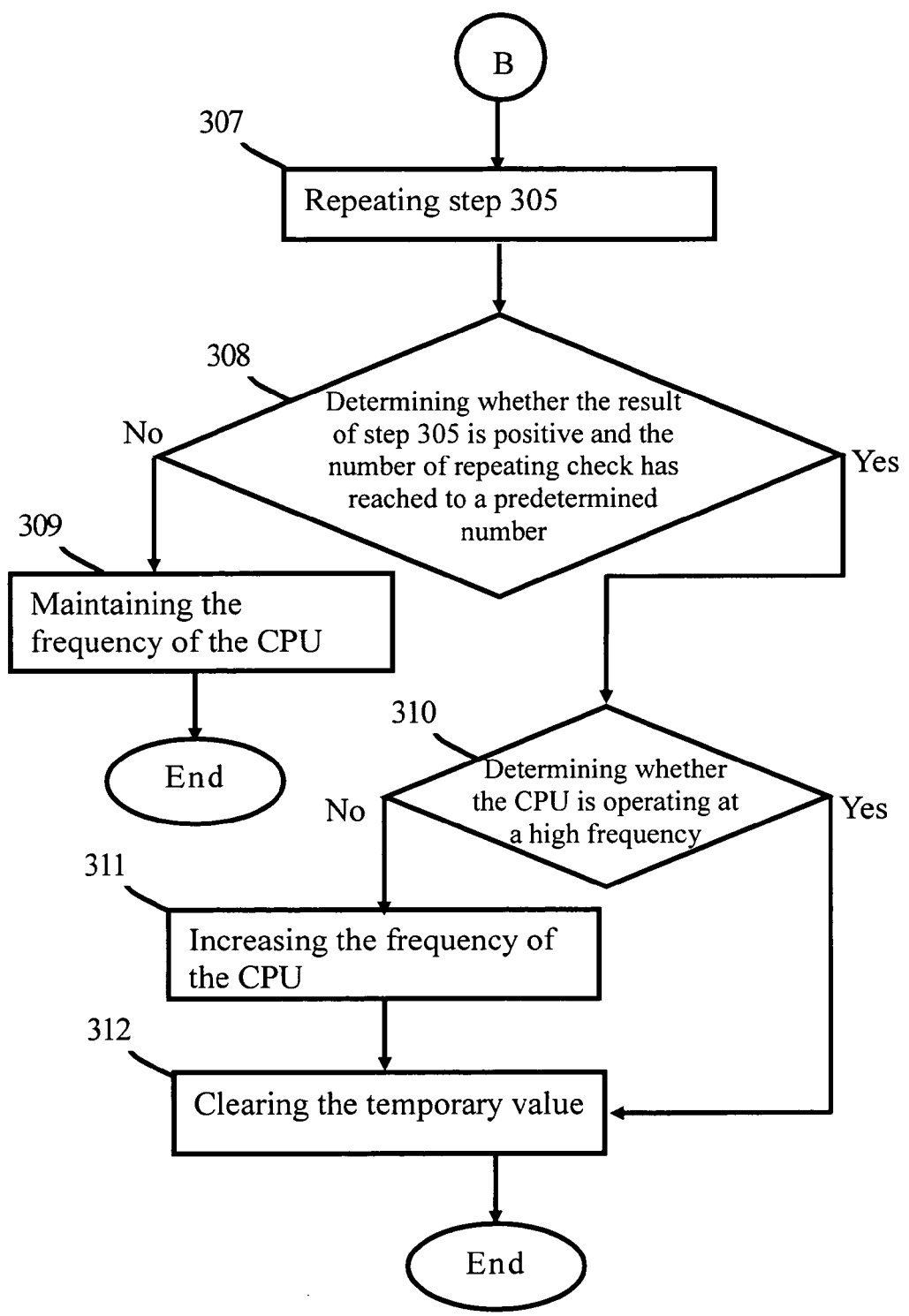

Please refer to FIG. 3A-3B. FIG. 3A-3B is a flow chart of a power management according to the invention.

Step 301: obtaining a value of the voltage signal.

The power management module 12 obtains the value of the voltage signal. The voltage signal is generated from the power supply 20, the sensing element 13 to the detecting module 11, which is obtained in step 202. The power management module 12 stores the value of the voltage signal in a register.

Step 302: determining whether a first predetermined value preset for the portable electronic device is exceeded.

The power management module 12 compares the preset first predetermined value with the value of the voltage signal. The first predetermined value is the maximum watt allowed by the portable electronic device 10 and the power supply 20 under normal condition. When the value of voltage signal is above the preset first predetermined value, it indicates that the consume power watt of the portable electronic device 10 is larger than the allowed power watt of the power supply 20.

Therefore, if the value of the voltage signal exceeds the first predetermined value, step 303 is performed: determining whether the CPU is operating at a low frequency.

The power management module 12 first checks whether the frequency of the CPU 14 is low. If the frequency of the CPU 14 is low, it is not necessary to lower the frequency of the CPU 14, and the power management can be ended.

If the frequency of the CPU 14 is not low, step 304 is performed: reducing the frequency of the CPU.

If the CPU 14 is operating at a high frequency, the power management module 12 reduces the frequency of the CPU 14 to lower the consume power watt of the portable electronic device 10. For example, the frequency of the CPU 14 is lowered from 2 GHz to 1 GHz.

Moreover, the power management module 12 also decides the method of reducing the frequency of the CPU 14. For example, the frequency of the CPU 14 can be reduced straight down to the allowed value; or in order to avoid the portable electronic device 10 becomes unstable, the power management module 12 can also reduce the frequency of the CPU 14 to the allowed value gradually. Alternatively, the charging process can be stopped first, then the frequency of the CPU 14 is reduced; or the charging process is gradually stopped, and then the frequency of the CPU 14 is gradually reduced. The above mentioned four methods can be selected based on the requirement or utilized according to the stability of the portable electronic device 10, and the invention can also utilize other method.

If the value of the voltage signal does not exceed the first predetermined value, step 305 is performed: determining whether the value of the voltage signal is below a second predetermined value preset for the portable electronic device 10.

The power management module 12 determines whether the value of the voltage signal is below a second predetermined value. The second predetermined value is the minimum consume watt of the portable electronic device 10 under the normal operation.

If the value of the voltage signal is not lower than a second predetermined value, step 306 is performed: maintaining the frequency of the CPU 14.

In step 305, the power signal supplied by the power supply 20 is determined as in the allowed operation range of the portable electronic device 10, so the frequency of the CPU 14 is maintained and the power management is ended.

If the value of the voltage signal is lower than the second predetermined value, step 307 is performed: repeating step 305.

At this time, the power management module 12 first repeats step 305, and then again determines whether the value of the voltage signal is lower than the second predetermined value preset for the portable electronic device 10. Meanwhile, the timer 15 is utilizing for recoding the number of the repeating check to obtain a temporary value.

Next, step 308: determining whether the result of step 305 is positive and the number of the repeating check has reached to a predetermined number.

In step 308, the power management module 12 repeatedly determines whether the value of the voltage signal is lower than the second predetermined value preset for the portable electronic device 10 and determines whether the number of repeating check has reached to a predetermined number. For example, if the power management module 12 has checked the value of the voltage signal three times and the values of the voltage signal are all lower than the second predetermined value, it indicates the check result of the power management module 12 is correct. However, the predetermined number can be any other number not just three times. Therefore, it can prevent the mistake caused by the power management module 12.

If the predetermined number has not been reached, it might because the power management module 12 made a mistake. Therefore, step 309 is performed: maintaining the frequency of the CPU 14 and ending the power management. Since step 309 is similar with step 306, there will be no more description.

If the predetermined number has been reached, step 310 is performed: determining whether the CPU 14 is operating at a high frequency.

If the value of the voltage signal is lower than the second predetermined value, it indicates the power supplied by the power supply 20 has enough watts to satisfy the portable electronic device 10. Therefore, the power management module 12 checks the frequency of the CPU 14 first.

If the CPU 14 is not operating at a high frequency, step 311 is performed: increasing the frequency of the CPU.

The power management module 12 increases the frequency of the CPU 14 to obtain the best performance of the portable electronic device 10.

However, the power management module 12 can also decide the method for increasing the frequency of the CPU 14. For example, the frequency of the CPU 14 can be directly increased to an allowed value; or in order to prevent the portable electronic device 10 from being unstable, the power management module 12 can also gradually increases the frequency of the CPU 14 to the allowed value. On the other hand, the frequency of the CPU 14 can be increased first, then the charging current is released; or the frequency of the CPU 14 can be gradually increased, then the charging current is also gradually released. The above mentioned four methods can be selected based on the requirement or the stability of the portable electronic device 10, and other design can also be applied.

Then, step 312 is performed: clearing the temporary value.

The power management module 12 clears the temporary value of the repeating check to avoid the power management module 12 from performing the determining step again.

If the CPU 14 is operating at a high frequency, step 312 is performed to end the power management. However, if the watts of the supplying power is not enough and the frequency of the CPU 14 is increased, it will cause the portable electronic device 10 or the power supply 20 being damaged. Therefore, the preferred embodiment of the invention performs step 307 and step 308 to repeat the check, and then performs step 309 and step 310 to increase the frequency of the CPU 14.

Finally, it returns back to step 301 to wait for next voltage signal input.

Moreover, the method of detecting the power signal of the invention can be performed in different step sequence as long as the purpose of the invention can be achieved.

With the above-mentioned system and method of the invention, when the portable electronic device 10 is connected to the power supply 20 supplying inefficient power watts, the power management is performed immediately to prevent the portable electronic device 10 or the power supply 20 from being overloaded or overheated causing damage. Furthermore, comparing with the prior art, the power signal detecting system 1 can lower the manufacturing cost.

Although the invention has been explained in relation to its preferred embodiment, it is to be understood that many other possible modifications and variations can be made without departing from the spirit and scope of the invention as hereinafter claimed.

What is claimed is:

1. A power signal detecting system comprising:
a power supply, for providing a power signal; and
a portable electronic device electrically connected to the power supply and used for receiving the power signal;
the portable electronic device comprising:
a sensing element for passing through the power signal;
a detecting module electrically connected to the sensing element and used for detecting the power signal passing through the sensing element, wherein the detecting module is a charger IC; and
a power management module electrically connected to the detecting module, calculating watts of the power signal according to a voltage signal of the detecting module, and identifying a supplying watt of the power supply and performing a power management for the portable electronic device, wherein the power management module determines that if a value of the power signal is above a first predetermined value being set for the portable electronic device, gradually reducing the frequency of a CPU of the portable electronic device or gradually stopping charging of the portable electronic device, wherein the first predetermined value is a maximum watt allowed by the portable electronic device and the power supply.

2. The power signal detecting system as claimed in claim 1, wherein the power management module determines that if a value of the power signal is below a second predetermined value being set for the portable electronic device, increasing the frequency of the CPU of the portable electronic device, wherein the second predetermined value is a minimum consume watt of the portable electronic device.

3. A power signal detecting method for detecting a power signal output by a power supply, the power signal being provided to a portable electronic device, the power signal detecting method comprising:
inputting the power signal to pass the power signal through a sensing element; detecting the power signal passing through the sensing element by a detecting module, wherein the detecting module is a charger IC;
calculating watts of the power signal according to a voltage signal of the detecting module and identifying a supplying watt of the power supply; and
performing a power management for the portable electronic device, wherein the power management comprises:
determining whether a value of the power signal is above a first predetermined value for the portable electronic device;
if the value of the power signal is above the first predetermined value, gradually reducing the frequency of a CPU of the portable electronic device or gradually stopping charging of the portable electronic device, wherein the first predetermined value is a maximum watt allowed by the portable electronic device and the power supply.

4. The power signal detecting method as claimed in claim 3 further comprising:
determining whether the CPU of the portable electronic device is operating at a low frequency; and
if the CPU is not operating at the low frequency, then reducing the frequency of the CPU of the portable electronic device.

5. The power signal detecting method as claimed in claim 3 further comprising: stopping charging of the portable electronic device.

6. The power signal detecting method as claimed in claim 3, wherein the power management further comprises:
determining whether the value of the power signal is below a second predetermined value for the portable electronic device, wherein the second predetermined value is a minimum consume watt of the portable electronic device;
if the value of the power signal is not below the second predetermined value, maintaining the frequency of the CPU of the portable electronic device; and
if the value of the power signal is below the second predetermined value, increasing the frequency of the CPU of the portable electronic device.

7. The power signal detecting method as claimed in claim 6 further comprising:
   determining whether the CPU of the portable electronic device is operating at a high frequency; and
   if the CPU is not at the high frequency, then increasing the frequency of the CPU of the portable electronic device.

8. The power signal detecting method as claimed in claim 6 further comprising:
   determining to provide the step of increasing the frequency of the CPU of the portable electronic device repeatedly.

9. The power signal detecting method as claimed in claim 6 further comprising: releasing the charging current.

10. The power signal detecting method as claimed in claim 6 further comprising: gradually increasing the frequency of the CPU.

11. The power signal detecting method as claimed in claim 6 further comprising: gradually releasing the charging current.

12. A portable electronic device electrically connectable to a power supply to receive a power signal, the portable electronic device capable of detecting the power signal, the portable electronic device comprising: a sensing element, wherein the power signal passes through the sensing element; a detecting module electrically connected to the sensing element and used for detecting the power signal passing through the sensing element, wherein the detecting module is a charger IC; and
a power management module electrically connected to the detecting module, calculating watts of the power signal according to a voltage signal of the detecting module, and identifying a supplying watt of the power supply and performing a power management for the portable electronic device, wherein the power management module determines that if a value of the power signal is above a first predetermined value being set for the portable electronic device, gradually reducing the frequency of a CPU of the portable electronic device or gradually stopping charging of the portable electronic device, wherein the first predetermined value is a maximum watt allowed by the portable electronic device and the power supply.

13. The portable electronic device as claimed in claim 12, wherein the power management module determines that if a value of the power signal is below a second predetermined value being set for the portable electronic device, increasing the frequency of the CPU of the portable electronic device, wherein the second predetermined value is a minimum consume watt of the portable electronic device.

14. The portable electronic device as claimed in claim 12, wherein the sensing element is a resistor.

15. The portable electronic device as claimed in claim 12, wherein the detecting module is a charger IC.

16. The portable electronic device as claimed in claim 12, wherein the power management module further comprises a timer.

* * * * *